(12) United States Patent
Chen

(10) Patent No.: US 8,181,474 B2
(45) Date of Patent: May 22, 2012

(54) SOLAR-POWERED AIR CONDITIONER USING A MIXTURE OF GLYCERIN, ALCOHOL AND WATER TO STORE ENERGY

(76) Inventor: Chengjun Julian Chen, White Plains, NY (US)

( * ) Notice: Subject to any disclaimer, the term of this patent is extended or adjusted under 35 U.S.C. 154(b) by 600 days.

(21) Appl. No.: 12/479,896

(22) Filed: Jun. 8, 2009

(65) Prior Publication Data
US 2009/0301119 A1    Dec. 10, 2009

Related U.S. Application Data

(63) Continuation-in-part of application No. 12/135,113, filed on Jun. 6, 2008, now Pat. No. 7,543,455.

(51) Int. Cl.
*F25B 27/00*    (2006.01)
(52) U.S. Cl. .............................. 62/235.1; 62/59; 62/434
(58) Field of Classification Search ........... 62/59, 235.1, 62/434, 435; 126/400; 165/10; 252/70
See application file for complete search history.

(56) References Cited

U.S. PATENT DOCUMENTS

| | | | | |
|---|---|---|---|---|
| 4,237,964 A | * | 12/1980 | Larue et al. ............... | 165/104.13 |
| 4,823,864 A | * | 4/1989 | Rockenfeller ........... | 165/104.12 |
| 5,237,832 A | * | 8/1993 | Alston ............................ | 62/200 |
| RE34,542 E | * | 2/1994 | Rockenfeller ........... | 165/104.12 |
| 5,375,429 A | * | 12/1994 | Tokizaki et al. ............. | 62/235.1 |
| 5,525,251 A | * | 6/1996 | Hammond ...................... | 252/70 |
| 5,811,025 A | * | 9/1998 | Kawai et al. .................... | 252/70 |
| 5,878,584 A | * | 3/1999 | Sasaki et al. .................... | 62/115 |
| 6,482,332 B1 | * | 11/2002 | Malach .......................... | 252/70 |
| 6,513,339 B1 | * | 2/2003 | Kopko ............................. | 62/94 |
| 6,539,738 B2 | * | 4/2003 | Gonzalez-Cruz et al. ... | 62/235.1 |
| 6,880,553 B2 | * | 4/2005 | Liu et al. ....................... | 126/628 |
| 7,062,923 B2 | * | 6/2006 | Kawaji et al. ..................... | 62/59 |
| 7,645,331 B2 | * | 1/2010 | Yang et al. ................. | 106/14.41 |
| 2003/0094003 A1 | * | 5/2003 | Cassell et al. .................... | 62/64 |
| 2007/0120094 A1 | * | 5/2007 | Yang et al. ................. | 252/389.2 |
| 2009/0266519 A1 | * | 10/2009 | Marinho et al. ......... | 165/104.19 |
| 2009/0301118 A1 | * | 12/2009 | Chen ........................... | 62/235.1 |

\* cited by examiner

*Primary Examiner* — Cheryl J Tyler
*Assistant Examiner* — Paolo Gonzalez

(57) ABSTRACT

A solar-powered air conditioning system including an energy-storage medium made of a mixture of 5%-20% glycerin, 2.5%-10% alcohol and water in a thermally insulated container is disclosed. While frozen, the said energy storage medium becomes slurry of thin sheets of ice dispersed in liquid, which will not damage the container and the heat-exchange pipes. The system uses a solar photovoltaic panel to directly drive a vapor-compression refrigeration unit to freeze the said energy storage medium. A ventilation system forces air through a heat-exchange coil in the said energy-storage medium, to generate chilled air to cool the space. In the absence of sunlight, the energy-storage medium can keep frozen for days. With or without sunlight, the flowing air chilled by the frozen energy-storage medium continues to cool the room or the entire building.

7 Claims, 2 Drawing Sheets

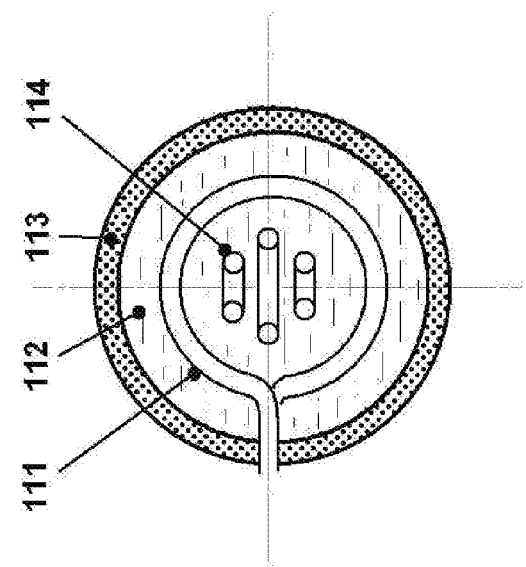
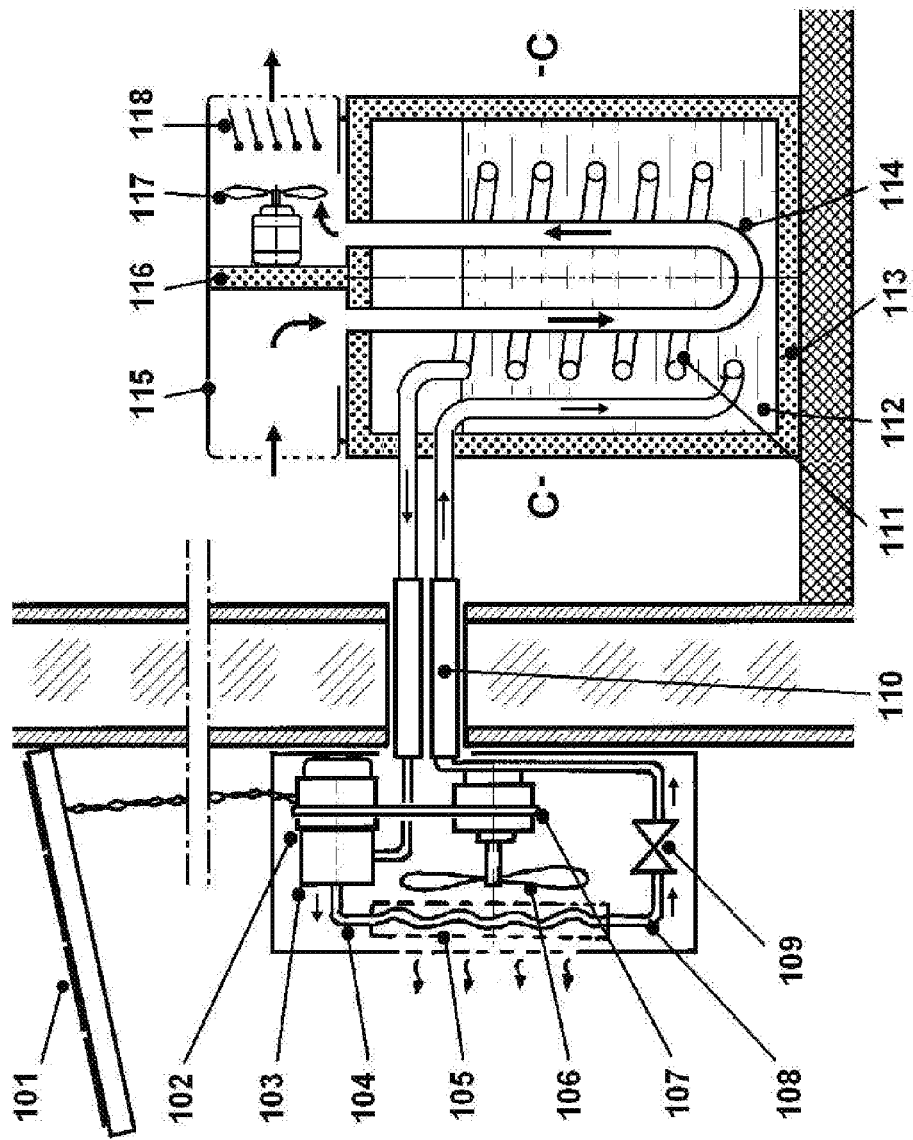
FIG 1B
FIG 1A

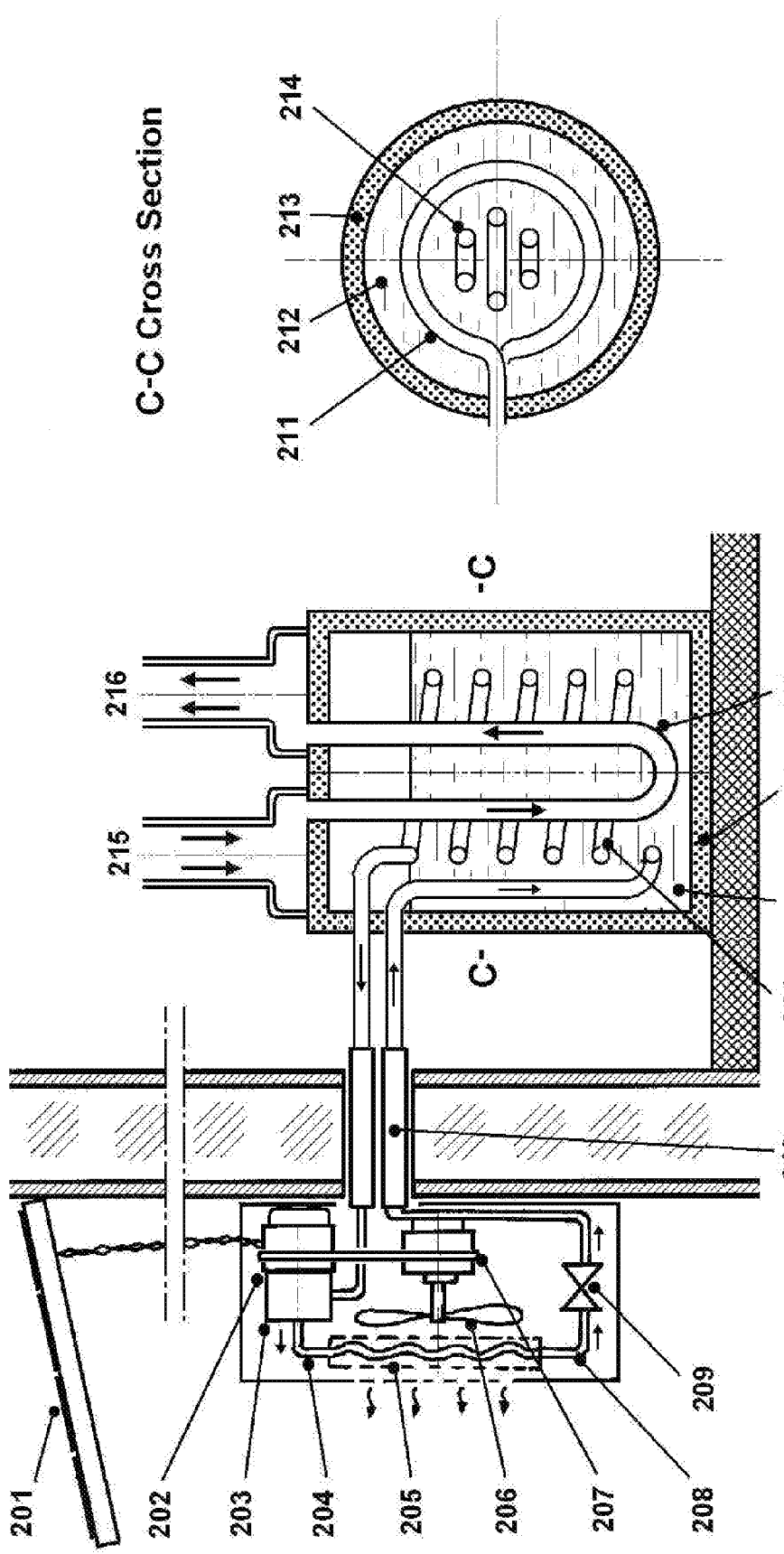

SOLAR-POWERED AIR CONDITIONER USING A MIXTURE OF GLYCERIN, ALCOHOL AND WATER TO STORE ENERGY

CROSS REFERENCE TO RELATED APPLICATIONS

This is a continuation in part to U.S. patent application Ser. No. 12/135,113, entitled "Solar-Powered Refrigerator Using a Mixture of Glycerin, Alcohol and Water to Store Energy", filed Jun. 6, 2008, to be issued as U.S. Pat. No. 7,543,455 on Jun. 9, 2009.

BACKGROUND OF THE INVENTION

Cooling of buildings consumes a huge amount of energy worldwide. For example, in the Sunbelt States of the US, including Alabama, Arizona, California, Florida, Georgia, Louisiana, Mississippi, Nevada, New Mexico, South Carolina, and Texas, air conditioning is the dominant end user of energy and the single leading cause of peak demand for electricity. From an economics point of view, reducing electricity demand for space cooling could save a lot for consumers. From a utility-infrastructure point of view, reducing air-conditioning electricity loads can lower demand for annual power generation and peak capacity. Coincidentally, in regions where air conditioning is needed the most, solar energy is also abundant. Especially, from day to day, the stronger the sunlight, the more air conditioning power is needed. Therefore, to utilize sunlight to power air conditioning is a logical solution.

Air conditioners using solar energy have been disclosed, for example, in U.S. Pat. Nos. 5,375,429, 5,878,584, 6,539,738, and 6,880,553. There is a common drawback of those methods: Solar energy is only available in sunny days, not in evenings and nights. By directly using the solar electricity to drive an air-conditioning unit to cool the rooms, it does not provide a relatively constant temperature throughout the entire day and night. Right after sunset, when the environment is still very hot, the solar power disappears. And the maximum cooling effect from direct sunlight is at noon time, which is not the hottest time of the day (the hottest time in a day is about 3-5 pm). In the evenings and nights, although air conditioning is still needed, there is no sunlight. Sunlight is also absent in cloudy and raining hours.

To resolve this problem, methods to store cooling power using ice have been disclosed in the 1980s, with the purpose of taking advantage of the price difference of electricity in peak time and night, mostly for large commercial buildings. On the other hand, for the cooling of vehicles and boats, the use of ice as a storage method for cold energy was disclosed in U.S. Pat. Nos. 5,237,832 and 7,062,923. The problem with those approaches is that when water is frozen to ice, the volume increases by 9%, and the expanding ice could damage the container and the heat-exchange coils. For air conditioners in buildings, the amount of ice is a good fraction of one ton or more than one ton, and the potential damage to the containers and tubes can be significant.

During the research for patent application Ser. No. 12/135,113, it is found experimentally that by freezing a mixture of 10% of glycerin, 5% of alcohol and 85% water, thin sheets of ice are formed, and the specific gravity of the ice sheets are similar to that of the liquid. In other words, with a proper composition, there is no significant expansion during freezing. As a result, the ice sheets do not stay at the top of the container. Instead, the ice sheets disperse over the entire volume. Mechanically, those thin sheets of ice are fragile and mobile, which will not damage the container as well as the tubes. Therefore, such mixtures are suitable to use as cold energy storage for air conditioners.

The present invention is related to a design of a solar-powered air conditioning system which utilizes the DC current directly from the solar cells to drive a vapor-compression refrigeration unit to freeze a mixture of glycerin, alcohol and water (typically 5%-10% of glycerol, 2.5% to 5% of alcohol, and 85%-90% of water), then use the stored cooling power of the partially frozen glycerin-alcohol-water mixture to cool the building. Because the low cost of crude glycerin and industry-grade alcohol, the elimination of the inverter and power distribution facilities, and the simplicity of the apparatus, the solar-powered air conditioning system could have a significant impact on energy savings.

BRIEF SUMMARY OF THE INVENTION

The current invention is a solar-powered air conditioning apparatus using an efficient, safe and inexpensive medium to store energy. It utilizes the DC current from solar cells to drive a vapor-compression refrigeration unit directly, bypassing the inverter and power grid. It utilizes a mixture of glycerin, alcohol and water to store cooling energy. The cooling coil of the refrigeration unit is placed in a container filled with such an energy-storage medium, thus to freeze it into thin sheets of ice dispersed in an aqueous solution of glycerin and alcohol. Experiments showed that with by freezing a mixture of 10% of glycerin, 5% of alcohol and 85% water, thin sheets of ice are formed, and the specific gravity of the ice sheets are similar to that of the liquid. The ice sheets do not stay at the top of the container. Instead, the ice sheets disperse over the entire volume. Mechanically, those thin sheets of ice are fragile and mobile, which will not damage the container as well as the pipes. On the other hand, the latent heat of the ice sheets is as large as regular ice, which is 80 calorie per gram, or 335 kilojoules per kilogram. A stream of air is passing through a set of heat exchange pipes in the partially frozen energy storage medium, and then circulates by a fan or a blower to cool the space. Using a thermostat, the temperature can be regulated, similar to ordinary air conditioning units.

Mixtures of water and glycerin as cold energy storage media for packaging were disclosed previously. For example, in U.S. Pat. No. 6,482,332, it was disclosed that a mixture of 90% water and 10% glycerin melts at about −2° C. to −7° C.; and a mixture of 80% water and 20% glycerin melts at about −6° C. to −14° C. Those energy storage media, usually packaged in plastic bags, are useful for keeping foods frozen. However, the purpose of that Patent is to lower the freezing temperature of water for the storage of frozen goods. On the other hand, in the present patent application, the purpose of mixing glycerin and alcohol to water is to improve the mechanical properties of the energy-storage media for air conditioners. Lowering the freezing point is not the purpose. For example, since the most comfortable temperatures of the rooms are around 20° C. or 68° F., an energy storage medium of freezing point between 0° C. and 10° C. can be used. However, hard and expanding ice is not suitable for such applications.

As an apparatus in a residential home or an office, safety is a major consideration. Both glycerin and alcohol are popular food ingredients and commonly used skin-care liquids; therefore it is very safe, especially at a low concentration. In addition, both glycerin and alcohol are not corrosive, which will not cause deterioration of the containers and heat-exchange pipes.

Cost is an important factor for the viability of a product. Decades ago, glycerin was fairly expensive. In recent years, a glut of crude glycerin exists as a byproduct of biodiesel. The market price of crude glycerin is $0 to $150 per metric ton. The impurities in crude glycerin are mainly rock salt, water, alcohol and residual fat, which are not toxic. Therefore, crude glycerin can be directly used without purification. Industry-grade alcohol is also inexpensive.

BRIEF DESCRIPTION OF THE DRAWINGS

FIGS. 1A and 1B show a solar-powered stand-alone air-conditioning system.
FIGS. 2A and 2B show the basic components of a solar-powered central air-conditioning system.

DETAILED DESCRIPTION OF THE INVENTION

FIGS. 1A and 1B show the basic components of a solar-powered stand-alone air-conditioning system for a single room. Solar panel 101 is installed either on a south-facing roof or a south-facing awning, and the solar-generated DC current powers a motor 102. Preferably, the motor 102 is directly coupled to the compressor 103 of a vapor-compression refrigeration unit, 103 through 109. The compressor 103 compresses the refrigerant through pipe 104 into condenser 105. Here, a fan 106 disperses the heat of the compressed refrigerant into air. The fan 106 is driven through the belt and wheel 107, also powered by motor 102. After condensing, through pipe 108, the refrigerant is let to expand by the expansion valve 109. The expanded refrigerant is going through a thermally insulated pipe 110 into a heat-exchange coil 111 to freeze the energy-storing medium 112, a mixture of glycerin, alcohol and water, in a thermally insulated container 113. The air in the room flows through the heat-exchange tubes 114, and cooled by the energy-storing medium 112. The air is handled in an enclosure 115 with a separation wall 116. The warm air is flowing through the heat-exchange tubes 114, driven by an electric fan 117. Fins 118 can be used to change the direction of wind. The C-C cross section diagram further clarifies the relation among the heat-exchange coil 111, the energy-storage medium 112, the insulated container 113 and the heat-exchange tubes 114. Because the frozen mixture of glycerin, alcohol and water is made of very thin sheets of ice, and its specific gravity is similar to that of the liquid, it would not damage the container and the heat-exchange coils.

FIGS. 2A and 2B show the basic components of a solar-powered central air-conditioning system. Solar panel 201 is installed either on a south-facing roof or a south-facing awning, and the solar-generated DC current powers a motor 202. Preferably, the motor 202 is directly coupled to the compressor 203 of a vapor-compression refrigeration unit, 203 through 209. The compressor 203 compresses the refrigerant through pipe 204 into condenser 205. Here, a fan 206 disperses the heat of the compressed refrigerant into air. The fan 206 is driven through the belt and wheel 207, also powered by motor 202. After condensing, through pipe 208, the refrigerant is let to expand by the expansion valve 209. The expanded refrigerant is going through a thermally insulated pipe 210 into a heat-exchange coil 211 to freeze the energy-storing medium 212, contained in a thermally insulated tank 213. The air is flowing through the heat-exchange tubes 214, and cooled by the energy-storing medium 212, into the air handling system through ducts 215 and 216. As in the conventional central air conditioning systems, the air handling system comprises a fan or a blower, a thermostat, and fins to control the temperature and the speed of air flow to the rooms. The returning air from the rooms is going through duct 215 and then cooled again by the heat-exchange tubes 214. The C-C cross section diagram further clarifies the heat-exchange coil 211, the energy-storage medium 212, the insulated container 213 and the heat-exchange tubes 214. Again, because the frozen mixture of glycerin, alcohol and water is made of very thin sheets of ice, and its specific gravity is similar to that of the liquid, it would not damage the container and the heat-exchange coils.

For practical reasons, here we make an estimate of how much energy-storage medium is required. For the case of a relatively large single room, using standard insulation, if the outside temperature is 30° C., to maintain a room temperature of 20° C., the rate of heat loss is 200 W. Each hour, the energy loss is 720 kJ. If the mass of the thermal-storage medium is 100 kg, assuming one half of the mass is frozen to ice, the latent heat is $1.67 \times 10^4$ kJ, and the thermal-storage medium can maintain the temperature for 24 hours. For an entire house, for example, equivalent to five relatively large rooms, a 500 kg thermal-storage medium could maintain the temperature for 24 hours.

For financial reasons, the size of solar panels is estimated as follows. Suppose the coefficient of performance (COP) of the refrigerator is 3-5, to freeze one half of the 100 kg glycerin-alcohol-water mixture in 5 hours, a power of 180 W to 300 W is required. If the price of solar cells is one dollar per watt, the cost of solar cells is $180 to $300. Assuming that the efficiency of solar panel is 20%, the area of solar cells is 0.9 square meters (10 square foot) to 1.5 square meters (16 square foot). For a central air conditioning system, the cost of solar cells could be five times higher: 0.9 kW to 1.5 kW with a cost of $900 to $1500 and an area of 50 to 80 square foot. Comparing with the savings of electricity, the cost is reasonable.

An important issue is the transportation and installation of the thermal-storage medium. Because water is available anywhere, the factory could supply an empty container and a mixture of glycerin and alcohol. For a single room, the required quantity of glycerin and alcohol is less than 20 lbs, which can be shipped in two one-gallon plastic bottles. At the site, glycerin and alcohol is mixed with water in the container. For an entire house, the required quantity of glycerin and alcohol is less than 100 lbs, or ten one-gallon plastic bottles.

What is claimed is:

1. A solar-powered air conditioner comprising:
   an energy-storage vessel filled with a mixture of glycerin, alcohol, and water as an energy storage medium which becomes a slurry of thin sheets of ice dispersed in liquid while frozen;
   a solar photovoltaic panel for generating electric power from sunlight;
   a motor driven by DC electricity generated by the solar photovoltaic panel;
   a vapor-compression refrigeration unit driven by the solar-powered motor to freeze the energy storage medium;
   a set of heat exchange coils in the energy storage vessel to generate chilled air by the frozen or partially frozen energy storage medium;
   a fan or a set of fans to distribute the chilled air to a space to be cooled.

2. The apparatus of claim 1 wherein the energy storage medium comprises water with 5% to 20% of glycerin and 2.5% to 10% of alcohol.

3. The apparatus of claim 1 wherein the alcohol comprises methanol, ethanol, isopropyl alcohol and similar alcohols.

4. The apparatus of claim 1 wherein the fan or set of fans is controlled by a thermostat to keep a temperature of the space to a preset value.

5. The apparatus of claim 1 wherein the energy-storage vessel is located in a room to be cooled and the fan is directly connected to the energy-storage vessel.

6. The apparatus of claim 1 wherein the energy-storage vessel is located in a place separated from the space to be cooled and the set of fans and ducts are used to distribute the chilled air to the space to be cooled.

7. The apparatus of claim 1 wherein the energy-storage vessel is located in a basement of a building and the set of fans and ducts are used to distribute the chilled air to rooms of the building.

\* \* \* \* \*